United States Patent [19]

Stanssens et al.

[11] Patent Number: 5,382,616
[45] Date of Patent: Jan. 17, 1995

[54] POLYISOCYANATE COMPOSITION

[75] Inventors: Dirk Stanssens, Lanaken; Ernst O. Dueber, Tervuren, both of Belgium

[73] Assignee: Imperial Chemical Industries plc, London, England

[21] Appl. No.: 706,828

[22] Filed: May 29, 1991

[30] Foreign Application Priority Data

May 30, 1990 [GB] United Kingdom ............... 9011992

[51] Int. Cl.$^6$ .................................................. C08K 5/09
[52] U.S. Cl. ...................................... 524/394; 524/398; 524/399; 524/400
[58] Field of Search .............. 524/394, 434, 435, 436, 524/437, 398, 399, 400

[56] References Cited

U.S. PATENT DOCUMENTS

| 4,111,861 | 9/1978 | Godlewski | 524/590 |
|---|---|---|---|
| 4,264,519 | 4/1981 | Hennig et al. | 260/453 |
| 4,296,020 | 10/1981 | Magrans, Jr. | 524/452 |
| 4,438,250 | 3/1984 | Grogler et al. | 528/66 |
| 4,758,604 | 7/1988 | Barron | 521/125 |
| 4,983,659 | 1/1991 | Gillis et al. | 524/186 |
| 5,002,999 | 3/1991 | Lowery et al. | 524/715 |
| 5,059,632 | 10/1991 | Horn et al. | 521/137 |
| 5,106,875 | 4/1992 | Horn et al. | 521/137 |

FOREIGN PATENT DOCUMENTS

| 0103996 | 3/1984 | European Pat. Off. |
| 0263622 | 3/1988 | European Pat. Off. |

*Primary Examiner*—Paul R. Michl
*Assistant Examiner*—Edward J. Cain

[57] ABSTRACT

Dispersion of a polyurea and a metal carboxylate in an organic polyisocyanate.

Dispersion of polyurea in an organic polyisocyanate characterized in that the amount of polyurea is at least 60% w.

The above dispersions are in particular suitable for preparing moulded elastomers and flexible foams respectively.

5 Claims, No Drawings

POLYISOCYANATE COMPOSITION

This invention relates to polyisocyanate compositions and to their use in the production of moulded articles by the reaction injection moulding process from reaction mixtures containing organic polyisocyanates and isocyanate-reactive components. The production of moulded articles, for example automotive body parts, from organic polyisocyanates and isocyanate-reactive components by moulding processes, such as for example the reaction injection moulding (RIM) process is well established. In a RIM process, two highly reactive liquid streams, one containing a polyisocyanate and the other containing isocyanate-reactive components, for example polyol and/or polyamine reactants, are impingement mixed and rapidly injected into a mould cavity. By this method, high production rates of moulded polyurethane, polyurea and related polymeric articles having excellent physical properties can be achieved.

Whilst the RIM process is eminently suited to the mass production of isocyanate-based moulded articles, it is essential to its successful and economic operation that the moulded product can be easily removed from the mould release agent, for example by means of a wax or a soap. Such mould release agents are often used externally. This procedure has the disadvantage that application of the release agent has to be repeated almost every time the mould is used, adding substantially to the time and cost of the process.

In order to overcome the problems associated with external mould release agents it has been proposed to use release agents of the internal type pre-blended with either the polyisocyanate or the isocyanate-reactive component. One type of internal release agent which has been successfully used in the production of other moulded plastics articles comprises metal carboxylates such as zinc stearate.

Unfortunately, such salts are soluble in neither the polyisocyanate nor with most of the usual isocyanate-reactive components. It has been proposed, therefore, to use the metal salts in conjunction with certain materials which have the effect of compatibilising the salts with the isocyanate-reactive compounds. Thus, for example, it has been proposed in European Patent Publications 119471, 173888 and 190317 to employ various amino compounds as compatibilisers.

It has now been found that stable dispersions of metal carboxylates in polyisocyanates can be obtained by dispersing the metal carboxylate into a dispersion of a polyurea in an organic polyisocyanate. Consequently the present invention is concerned with a polyisocyanate composition which is a dispersion of a polyurea and a metal carboxylate in an organic polyisocyanate.

Dispersions of a polyurea in an organic polyisocyanate and processes for preparing them are generally known in the art. Reference is made in that respect to U.S. Pat. Nos. 4,264,519 and 4,438,250 and European Patent Applications 263622 and 103996.

The dispersions according to the invention can be suitably used as the polyisocyanate in the preparation of moulded articles, especially according to the RIM process, and provide internal mould release properties. Further the dispersions according to the present invention are stable for a considerable period of time and hence, do not need to be made shortly before being consumed. Further applying the metal carboxylate in the polyisocyanate provides an improved flexibility towards the use of isocyanate-reactive components.

It is considered surprising that the dispersions according to the present invention are stable and provide useful polyisocyanates for preparing polyurea/polyurethanes and polyureas by reacting said dispersion with isocyanate-reactive compounds in view of the fact that metal carboxylates like zinc stearate in the art are considered as catalysts, like for trimerisation and allophanate and biuret formation.

The dispersions according to the present invention are made by dispersing an amount of metal carboxylate into a dispersion of polyureas in polyisocyanate. If desired the dispersion so obtained may be diluted with further modified or unmodified polyisocyanate. The dispersing of the metal carboxylate is a simple operation and may be conducted by high shear mixing without external heating.

The preparation of the dispersion of polyurea in polyisocyanates is known in the art. The references mentioned before in this respect should be regarded as incorporated by reference. In general such preparation is suitably conducted by combining an amine and a polyisocyanate at ambient or slightly elevated temperatures and under high shear mixing conditions. As will be explained in more detail hereinafter modified polyisocyanates may be used as well. The polyurea dispersion may be made in several ways in case modified polyisocyanates are used:

1. prepare the polyurea dispersion from unmodified polyisocyanate and add modified polyisocyanate; since the amount of polyurea particles of the dispersion, which is to be blended with the modified polyisocyanate, could be such that high shear mixing is cumbersome or impossible, it is often desirable to heat the dispersion to 50°–110° C. before adding the modified polyisocyanate;
2. prepare the polyurea dispersion from unmodified polyisocyanate and subsequently modify this dispersion; and
3. modify unmodified polyisocyanate and subsequently prepare the polyurea dispersion in this modified polyisocyanate with or without the subsequent addition of modified or unmodified polyisocyanate.

The present invention also refers to dispersions of a polyurea in an organic, preferably unmodified, polyisocyanate containing a high amount of polyurea, i.e. at least 60% w and preferably 65% w–95% w. The invention still further is concerned with blends of dispersions of polyurea in an organic unmodified polyisocyanate with a, preferably modified, polyisocyanate. The use of blending instead of preparing polyurea in modified polyisocyanate or preparing modified polyisocyanate from unmodified polyisocyanate comprising polyurea particles is that no modification of the polyurea occurs or that no polyurea particle is formed from modified polyisocyanate. If modified or unmodified polyisocyanate is used as blending agent with a polyurea dispersion in unmodified polyisocyanate a remarkable advantage is obtained: a lower viscosity than the one obtained by preparing urea in modified polyisocyanate or by preparing modified polyisocyanate from unmodified polyisocyanate comprising polyurea particles. Especially in case a catalyst is used to prepare the modified polyisocyanate, which catalyst could induce the transformation of the polyurea dispersion, e.g. in case of allophanate modified polyisocyanates, the use of a blend appeared to show beneficial effects.

The organic polyisocyanates useful in this invention have a number-averaged isocyanate functionality from 1.8 to 4.0, preferably from 1.9 to 2.3, and a number-averaged molecular weight between 120 and 1800, preferably between 170 and 800. At least 50 mole percent, preferably at least 90 mole percent, of isocyanate groups in the species comprising the polyisocyanate are bound directly to aromatic rings.

At least 50 mole percent, preferably at least 70 mole percent, of the species comprising the polyisocyanate are diisocyanates.

Suitable aromatic polyisocyanates include, for example, p-phenylene diisocyanate: m-phenylene diisocyanate; 2,4-toluene diisocyanate; 2,6-toluene diisocyanate; naphthalene diisocyanate; polymethylene polyphenyl polyisocyanates; 2,4'-diphenylmethane diisocyanate (2,4'-MDI); 4,4'-diphenylmethane diisocyanate (4,4'-MDI); 3,3'-dimethyl-4,4'-biphenylene diisocyanate; polymethylene polyphenylene polyisocyanates having a functionality of more than 2; and mixtures of the above compounds. The MDI isomers (2,4' and 4,4') and mixtures and polymeric derivatives thereof are most preferred.

The polyisocyanate may include minor amounts of aliphatic polyisocyanates. Suitable aliphatic polyisocyanates include isophorone diisocyanate; 1,6-hexamethylene diisocyanate; 1,4-cyclohexyl diisocyanate; m-tetramethylene-xylylene diisocyanate; saturated analogues of the above mentioned aromatic polyisocyanates and mixtures thereof.

In the present application the above polyisocyanates are regarded as unmodified polyisocyanates. Modified polyisocyanates on the other hand are those polyisocyanates which have been treated so as to contain polyurethane, polyurea, biuret, allophanate, uretidinedione, isocyanurate, carbodiimide and/or uretonimine moieties excluding those polyureas which are of a particulate nature in the polyisocyanate, i.e. the polyureas which form a dispersion in the polyisocyanate and which in general are prepared by reacting a low molecular weight, sterically hindered amine with a stoichiometric excess of polyisocyanate as will be explained hereinafter.

Suitable uretonimine-modified polyisocyanates can be used and are prepared by a process wherein an aromatic polyisocyanate is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with polyols or amine terminated polyethers such as:

(a) polyether polyols and/or hydrocarbon-based polyols having a molecular weight from 60 to 400, and an average hydroxyl functionality from 1.9 to 2.5;

(b) polyether (and/or thioether) polyols having a molecular weight of at least 400, preferably 1000 or higher, and an average hydroxyl functionality from 1.9 to 4;

(c) polyester polyols having a molecular weight from 100 to 1000, and an average hydroxyl functionality from 1.9 to 2.5;

(d) polyester polyols having a molecular weight greater than 1000, and an average hydroxyl functionality from 1.9 to 4;

(e) amine terminated polyethers having a molecular weight of at least 1000, and an average amine hydrogen functionality from 1.9 to 8; and (f) mixtures of two or more of the above isocyanate-reactive compounds.

Examples of suitable polyether or hydrocarbon polyols having a molecular weight from 60 to 400 include propylene glycol; dipropylene glycol; tripropylene glycol; 2,3-butanediol; 1,3-butanediol, 2,2-dimethyl-1,3-propanediol and polypropylene glycols.

Examples of suitable polyether polyols having a molecular weight of at least 400, preferably 1000 or higher, include polyethylene glycols; poly-oxyethylene poly-oxypropylene copolymer diols; and polytetramethylene glycols, higher polypropylene glycols, polyoxypropylene triols, etc. The polyoxypropylene based polyols are preferred.

Examples of suitable polyester polyols having a molecular weight from 100 to 1000 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols and/or oxyalkylene polyols, to form the corresponding polyalkylene and polyoxyalkylene esters or copolymers thereof having a molecular weight of at least 1000. The polybasic carboxylic acids used may be aliphatic, aromatic, or both.

Examples of suitable amine terminated polyethers having a molecular weight of at least 1000 include polypropylene oxide triamines, polyoxypropylene diamines, and polyoxyethylene/polyoxypropylene copolymer diamines and triamines.

It is preferred that the organic polyisocyanate contains a "softblock" prepolymer, i.e. a high (1000 or higher) molecular weight polyether and/or polyester segment. It is preferred that at least about one third, preferably at least 40%, by weight of the total softblock in the polymer be derived from the organic polyisocyanate. High molecular weight aliphatic polyether species (i.e., categories (b) and/or (e) above) are preferred, particularly if the molecular weight of the species is 2000 to 6000 and the reactive functionality is 2 to 8. The polyisocyanate composition may contain a carboxylic acid (e.g. a fatty acid such as lauric, stearic, palmitic, oleic, and the like) or latent acid (e.g. an anhydride of any of the preceding acids or cyclic acid anhydrides, such as cis-1,2-cyclohexane-dicarboxylic acid anhydride) to promote the reaction between the polyisocyanate and aliphatic imino-functional ingredients, if present, in an isocyanate-reactive component. The level of such acids can be about 0.01 to 4% by weight of the total polymer. The range of total softblock content in the polymer material (as a percent by weight of the total polymer) may range from about 10 to about 95%, preferably 20 to 80%, and most preferably 30 to 70%.

A particularly preferred polyisocyanate is a polyisocyanate composition comprising a reaction product of a stoichiometric excess of an organic polyisocyanate and:
(i) a polymeric polyol having an average nominal hydroxyl functionality greater than 2 and an average hydroxyl equivalent weight of from 500 to 5000, and
(ii) a polymeric polyamine having an average nominal primary and/or secondary amino functionality of from 2 to 3 and an average amine equivalent weight of from 500 to 5000, the polyol and the polyamine having glass transition temperatures below room temperature.

Another suitable polyisocyanate is a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups. Such polyisocyanate compositions have been described in more detail in European Patent Application 312365.

Another suitable polyisocyanate is a polyisocyanate composition which is the product of reacting an imino-functional or enamine-containing compound having a molecular weight of at least 1000 with a stoichiometric excess of an organic polyisocyanate. Such polyisocyanate compositions have been described in more detail in European Patent Application 312366.

Still another suitable polyisocyanate is a polyisocyanate composition obtained by reacting polymeric polyamines with an excess of polyisocyanates such that the initially formed urea-modified isocyanates are converted to biuret-modified isocyanates. Such polyisocyanates have been described in more detail in European Patent Application 312227.

The amines suitable for making the dispersion of polyurea in polyisocyanate may be selected in function of the insolubility of the polyurea, obtained by reacting the amine with an excess of a selected polyisocyanate, from organic amines which are primary or secondary amines, aromatic or aliphatic, cyclic or acyclic and of a mono-amine or polyamine type. Suitable amines may in particular be selected from 2,4-diaminotoluene and its commercial mixtures with 2,6-diaminotoluene; 4,4'-diaminodiphenylmethane and its commercial mixtures with 2,4'-diaminodiphenylmethane; hexamethylene diamine; 4,4'-diaminodicyclohexylmethane and its homologues and 3,3,5-trimethyl-5-aminomethylcyclohexylamine; 1,6-diamino-2,2,4-trimethylhexane; 3,3,5-trimethyl-3-aminomethyl-cyclohexylamine;1-methyl-4-(2-methyl-2-aminoethyl)cyclohexylamine; tertiary butylamine; 3(4), 8(9)-bis (aminomethyl) tricyclodecane; 1,4-di(aminomethyl) cyclohexane; 2,2,4,4-tetramethyl-1,3-diamino-cyclobutane; 1-methylbutylamine; 2-methyl cyclohexylamine; 2-methyl-6-isopropylaniline; 2,6-diisopropylaniline; 2,6-dimethylpiperidine, 3,5-diethyl-2,4-toluenediamine and 3,5-diethyl-2,6-toluenediamine.

The metal carboxylates may be selected from those wherein the metal is selected from Groups I or II of the Periodic Table of Elements, aluminium, chromium, molybdenum, iron, cobalt, nickel, tin, lead, antimony or bismuth. Preferably the metals are lithium, sodium, potassium, copper, magnesium, calcium, barium, zinc, cadmium, aluminium, chromium, iron, cobalt, nickel, tin, lead, antimony, boron, silicon or bismuth or combinations thereof. More preferably the metals are lithium, copper, magnesium, calcium, barium, zinc, cadmium, aluminium, iron, cobalt or nickel or combinations thereof. Most preference is given to zinc.

The carboxylates may be selected from those derived from saturated or unsaturated aliphatic or cycloaliphatic carboxylic acids having from 8 to 30, preferably from 12 to 18, carbon atoms.

Particularly suitable carboxylic acids are oleic acid, lauric acid, palmitic acid, stearic acid, and mixtures thereof.

Particularly suitable metal carboxylates include zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel laurate, copper stearate, copper oleate, copper laurate, copper palmitate.

Zinc stearate is the most preferred metal carboxylate.

The metal carboxylates often comprise a low amount of the corresponding carboxylic acid. In the present context these are considered to be included in the term metal carboxylate.

The amount of dispersed polyurea particles in general ranges from 1–40% by weight calculated on the whole polyisocyanate composition and preferably from 3–25 and more preferably from 5–15% by weight.

The amount of metal carboxylate may range from 0.1–10% by weight calculated on the whole polyisocyanate composition and preferably from 0.5–5 and more preferably from 1–3% by weight.

The polyisocyanate composition according to the present invention comprising the dispersed polyurea and metal carboxylate in general will have an NCO content of 5–30% by weight calculated on the whole polyisocyanate composition.

The polyisocyanate compositions of the invention, either alone or in conjunction with other organic polyisocyanates, may be reacted with active hydrogen containing materials, using known techniques, to form polyurethane/polyurea or polyurea materials. The compositions comprising the metal carboxylate are of particular value in the production of elastomers, especially by the reaction injection moulding (RIM) process while the compositions comprising the high polyurea content and blends thereof with polyisocyanate are in particular suitable for the preparation of flexible foams.

Thus, in a further aspect of the invention, there is provided a reaction system for use in making a reaction injection moulded elastomer, said system comprising the following components:
(A) a polyisocyanate composition according to the present invention, and
(B) an isocyanate-reactive component.

Component B of the reaction systems of the invention, the isocyanate-reactive component, may contain the usual ingredients of such components, for example soft block components, chain extenders and mixtures thereof. Typical soft block components include polyols, polyamines, imino-functional compounds, enamine-containing compounds and mixtures thereof having equivalent weights of at least 750 whilst typical chain extenders include compounds of the same classes having equivalent weights below 750.

Polyols having equivalent weights of at least 750 which may be present in Component B include hydroxy-terminated polythioethers, polyesters, polyesteramides, polycarbonates, polyacetals, polyolefins, polysiloxanes and, especially, polyethers. Preferred polyols include polyoxypropylene and poly(oxyethylene-oxypropylene) diols and triols and mixtures thereof. Preferred equivalent weights are in the range from 750 to 5000, especially from about 1000 to about 3000.

Polyamines having equivalent weights of at least 750 which may be present in Component B include aminoterminated polythioethers, polyesters, polyesteramides, polycarbonates, polyacetals, polyolefins, polysiloxanes and, especially, polyethers. Polyether polyamines which may be used include products obtained by the reductive amination of polyether polyols as described, for example, in U.S. Pat. No. 3,654,370, or by the cyanoethylation of polyols followed by hydrogenation. Polyoxypropylene and poly(oxyethylene-oxypropylene) diamines and triamines and mixtures thereof are preferred. Preferred equivalent weights are in the range from 750 to 5000, especially about 1000 to about 3000.

Imino-functional polymers which may be present as soft block components in Component B have been described in U.S. Pat. No. 4,794,129. Preferred imino-functional polymers include imine-terminated polyethers such as may be obtained by reacting a polyether polyamine, especially a polyoxypropylene diamine or triamine, with an aldehyde or ketone.

Enamine functional polymers may be prepared either from secondary amine terminated resins (e.g. polyethers) by reaction with ketones/aldehydes having one or more alpha hydrogens, or by reacting ketone/aldehyde terminated resins (bearing alpha hydrogens) with secondary amines, providing for removal of the $H_2O$ formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidizing a primary hydroxy functional resin to the corresponding polycarboxylic acid, conversion of the said groups to orthoesters and treatment of the latter, with an excess of a secondary amine. Each orthoester must contain at least one alpha hydrogen atom.

Polyols having equivalent weights below 750 which may be present as chain extenders in the B Components of the reaction systems of the invention include simple non-polymeric diols such as ethylene glycol and 1,4-butanediol.

Polyamines having equivalent weights below 750 which may be used as chain extenders include aliphatic, cycloaliphatic or araliphatic polyamines containing two or more primary and/or secondary amino groups and, especially, aliphatic and aromatic polyamines.

Aromatic polyamines useful as chain extenders in the reaction systems of the invention particularly include diamines, especially those having molecular weights from about 100 to about 400, preferably between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3'-dimethyl-5,5'-diethyl-4,4'-diaminodiphenylmethane, 3,3',5,5'-tetraisopropyl-4,4'-diaminodiphenylmethane and the like and mixtures thereof. Aliphatic polyamines are in particular of the type described hereinbefore for those having an equivalent weight of at least 750.

Imino-functional and/or enamine-containing compounds suitable as chain extenders typically have molecular weights below 1500, especially between about 100 and about 600. In other respects, for example structure and functionality, they may have the characteristics of the higher molecular weight imino-functional or enamine-containing compounds described above.

Examples of preferred imino-functional compounds for use as chain extenders in the reaction systems of the invention have been described in the aforementioned U.S. Pat. No. 4,794,129.

Examples of suitable enamine-containing chain extenders are described in U.S. Pat. No. 4,342,841 and 4,552,945. Other examples include the bis-enamines formed by reacting piperazine with simple carbonyl compounds such as acetone, methyl, ethyl ketone, cyclohexanone and the like.

Particularly valuable reaction systems for use in the RIM process comprise:
(A) a polyisocyanate composition according to the present invention, and
(B) an isocyanate-reactive component comprising:
  (i) a chain extender comprising:
    (a) 0–100% of an aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly,
    (b) 100–0% of an imino- and/or enamino-functional aliphatic compound having from about 1.1 to about 3 isocyanate-reactive imino and/or enamine groups per molecule and a molecular weight less than 1500, and
  (ii) an imino- and/or enamino functional polyether having an average of from about 1.1 to about 5 isocyanate-reactive imino and/or enamine groups per molecule and an average molecular weight of from about 1500 to about 10,000 and wherein said imino and/or enamine groups constitute at least 50 mole per cent of the isocyanate-reactive groups in said polyether and at least 50 mole per cent of said imino- and/or enamino-functional polyether species contain 2 or more imino and/or enamine groups per molecule.

The reaction systems of the present invention can further include additives such as further internal mold release agents, catalysts, surfactants, blowing agents, fillers (which may be reinforcements), plasticizers, fire retardants, coupling agents, and the like. Such additives are in general combined with the isocyanate-reactive composition before it is brought in contact with the polyisocyanate composition.

Suitable further internal mold release agents include, for example, a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mold release additive is Goldschmidt-412T (available from Goldschmidt Silicones). The amount of further internal mold release agent used can be up to 5.0 percent by weight of the total reactants (i.e. total polymer). In general further internal mold release agents are not required provided an effective amount of metal carboxylate is employed.

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Another group of catalysts, which are more specific for the isocyanate-amine reaction, and particularly for the reaction of isocyanates with aliphatic imines, include carboxylic acids and precursors thereof (such as acid anhydrides). Specific examples of carboxylic acid catalysts include oleic acid, 1,12-dodecanedioic acid, isophthalic acid, and the like. These types of catalysts are described in U.S. Pat. No. 4,499,254; 4,487,908; and 4,487,912; and in 3,789,045 (for the imine-isocyanate reaction.)

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gasses such as air, $CO_2$, $N_2O$, or nitrogen, and low boiling halogenated hydrocarbons such as methylene chloride and trichloromonofluoromethane. The amount of blowing agent used is less than about 4 percent by weight of the total reactants.

Suitable fillers include fiberglass reinforcement fibers, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibers are always preferred for ease of processing when they are incorporated as part of the "A" or "B" component streams. Other particularly suitable fillers are mica, fumed silica, flake glass, Wollastonite, calcium carbonate, carbon black, and the like.

The products of the present invention can be shaped into useful articles such as automobile fascias, or panels, by reaction injection molding (RIM) process, which is performed in a RIM machine.

RIM machines are well known in the art and include those supplied by Admiral Equipment Corp., Akron, Ohio by Cincinnati Milacron Corp., Cincinnati, Ohio, by Battenfeld Co., West Germany and by Kraus Maffei GmbH, West Germany.

The ingredients of component (B) may be blended in a suitable container and agitated at a temperature from about 20° C. to about 100° C. for a time between five and sixty minutes using a high shear blade such as a Cowles blade, at a rotational speed of 50 to 2500 rpm. It is preferred to mix and process the ingredients of component (B) at or near ambient (20°) temperature.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C. to about 40° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.95 to 1.10. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamines groups, ketene animal groups, mercapto(-SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mould at a velocity from 0.15 Kg/sec to 35 Kg/sec, preferably 2 to 10 Kg/sec. The mould is heated to a temperature from about 20° C. to 250° C. Suitable moulds are made of metal such as aluminum or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

The individual components of the reaction systems are desirably stored and processed under an inert atmosphere such as dry air or nitrogen.

The formulations of the invention are processed at a ratio of isocyanate equivalents to isocyanate-reactive equivalents between 0.70 and 1.90, preferably between 0.95 and 1.10; with the proviso that, if a catalyst for the conversion of isocyanate to isocyanurate groups is present, the ratio may extend up to about 15.00. Examples of suitable isocyanurate catalysts include alkali metal salts of carboxylic acids, for example, potassium 2-ethylhexoate.

For the preparation of flexible foams, the polyisocyanate compositions of the invention may be reacted with conventional flexible foam polyols, for example polyether triols or corresponding polyester polyols, in the presence of conventional blowing agents, catalysts, surfactants and other usual additives.

The polyisocyanate compositions according to the present invention show a very good stability which may even be more than one month at ambient temperature.

The invention is illustrated by the following Examples.

EXAMPLE 1

A mixture of isomers of 3(4), 8(9)-bis(aminomethyl) tricyclo[3.2.1.0$^{1,6}$] decane (140 g) was added at 45° C. under high shear mixing conditions to a mixture of Suprasec MPR (3930 parts by weight) and Suprasec ML (292 parts by weight) polyisocyanate.

The reaction mixture was kept at 45° C. for 3.5 hours. The product obtained had an NCO value of 31.1% by weight (% w) and a urea content of 11.5% w. To this dispersion was added Suprasec VM 20 polyisocyanate (238 g) from Imperial Chemical Industries PLC (Suprasec is a trade mark of Imperial Chemical Industries PLC). Then the temperature was raised to 80° C. and a mixture of low molecular weight diols (400 g and average equivalent weight of 62) was added dropwise to the dispersion. This reaction mixture was stirred for 30 minutes at 80° C. The dispersion obtained had a viscosity of 1660 mPa.s at 25° C. and an NCO value of 22% w. Zinc stearate (2% w) was dispersed in this dispersion by stirring under high shear mixing conditions at 45° C. during 15 minutes. The dispersion obtained was stable for more than 2 months at room temperature.

EXAMPLE 2

135 g of the isomers used in example 1 was added similarly as in example 1 to Suprasec ML polyisocyanate (490 g). The reaction product had an NCO value of 17% w and a urea content of 77% w. To this dispersion an allophanate modified polyisocyanate (4375 g) having an NCO value of 17% w was added. This mixture was heated to 80° C. and stirred for 10 minutes under high shear mixing conditions. Then the blend was cooled to 45° C. and, subsequently, 2% w of zinc stearate was dispersed in this dispersion by stirring under high shear conditions at 45° C. for 15 minutes. The viscosity of the dispersion so obtained was 2400 mPa.s at 25° C.; the NCO value was 16.8% w and the dispersion was stable for more than one month.

EXAMPLE 3

135 g of a mixture of the isomers used in example 1 was added at 45° C. under high shear mixing conditions to 4,4'-MDI (490 g). The product obtained had an NCO value of 17% w and a urea content of 77% w. To this dispersion was added a prepolymer (4372 g) based on MDI (3937 g) and a mixture of low molecular weight diols (435 g) having an average equivalent weight of 62, the prepolymer having an NCO value of 23% w. The mixture was heated to 80° C. and mixed under high shear conditions for 10 minutes. Then the dispersion was cooled to 45° C. and, subsequently, 2% w zinc stearate was dispersed in this dispersion by stirring under high shear conditions at 45° C. for 15 minutes. The dispersion so obtained had a viscosity of 2100 mPa.s at 25° C., an NCO value of 22,5% w and a urea content of 9.6% w.

The dispersion was stable for more than 2 months. In the above experiments the term "stable" means that no phase separation was observable.

EXAMPLE 4

The dispersion obtained in example 3 (40.80 parts by weight) was used in the preparation of elastomers in a closed mould by the reaction injection moulding process by reaction with 43.51 pbw of Jeffamine T-5000 and 15.69 pbw of DETDA. The RIM machine was a Battenfeld SHK-65 with a 30×30×0.3 cm test plaque mould. The mould was maintained at about 95° C. The elastomers had good properties and more than 20 parts could be readily demoulded without applying an external mould release agent apart from applying such an agent at the beginning of the experiment. The density was 1137 kg/m$^3$.

We claim:

1. Dispersion of a polyurea and a metal carboxylate in an organic polyisocyanate, wherein said metal carboxylate is selected from the group consisting of copper, magnesium, calcium, barium, zinc, cadmium, aluminum, chromium, iron, cobalt, nickel, antimony, boron, silicon and mixtures thereof.

2. Dispersion according to claim 1 characterised in that the amount of metal carboxylate is 0.1 to 10% by weight.

3. Dispersion according to claim 1 characterised in that the amount of polyurea is 1–40% by weight.

4. Dispersion according to claim 1 characterised in that the metal carboxylate is a zinc carboxylate, wherein the carboxylate has 12–18 carbon atoms.

5. Dispersion according to claim 1 characterised in that the NCO content of the dispersion is 5–30% by weight.

* * * * *